United States Patent
Thompson

[11] 4,008,735
[45] Feb. 22, 1977

[54] PRESSURE REDUCING FIRE VALVE
[75] Inventor: William S. Thompson, Elkhart, Ind.
[73] Assignee: Elkhart Brass Manufacturing Co., Inc., Elkhart, Ind.
[22] Filed: Dec. 13, 1974
[21] Appl. No.: 532,342

Related U.S. Application Data
[63] Continuation-in-part of Ser. No. 403,928, Oct. 5, 1973, abandoned.

[52] U.S. Cl. .............................. 137/495; 137/496
[51] Int. Cl.² ....................................... F16K 31/14
[58] Field of Search .......... 137/497, 495, 496, 505, 137/28, 494; 251/50, 53, 54, 63.4

[56] References Cited
UNITED STATES PATENTS

| | | | |
|---|---|---|---|
| 1,167,287 | 1/1916 | Ford | 137/496 X |
| 2,339,384 | 1/1944 | Duckworth | 251/63.4 |
| 2,621,015 | 12/1952 | MacGeorge | 251/50 |
| 2,707,484 | 5/1955 | Rush | 251/63.4 |
| 3,400,734 | 9/1968 | Rosenberg | 137/495 |
| 3,692,047 | 9/1972 | Camp | 137/495 |

FOREIGN PATENTS OR APPLICATIONS
130,752  10/1946  Australia ........................... 137/496

*Primary Examiner*—Harold W. Weakley
*Attorney, Agent, or Firm*—Oltsch & Knoblock

[57] ABSTRACT

A fire valve having a cooperating valve seat and shiftable valve part. The valve part is carried by a floating valve stem. The first valve includes a piston and cylinder combination which is operatively associated with the valve stem and which causes the valve part to be selectively spaced from the valve seat in response to fluid pressure in the valve.

5 Claims, 5 Drawing Figures

PRESSURE REDUCING FIRE VALVE

CROSS REFERENCE TO RELATED APPLICATION

This is a continuation-in-part of application Ser. No. 403,928, filed Oct. 5, 1973 now abandoned.

SUMMARY OF THE INVENTION

This invention relates to a valve and has specific but not limited application to a pressure reducing fire valve for use in high-rise buildings or in other installations where the water supply pressure exceeds safe nozzle or sprinkler pressure.

The fire valve of this invention includes a body having an inlet chamber and an outlet chamber. A valve seat is located within the valve body and separates the inlet and outlet chambers. A valve stem carrying a valve part at its lower end is shiftably positioned within the valve body. The valve stem is of the floating type and has a piston which is operatively associated with its upper end and which is housed within a chamber. A handle having a stem connected thereto is threaded into the piston chamber and upon rotation abuts the valve stem to urge the valve part connected thereto into sealing engagement with the valve seat. A flow passage places the outlet chamber of the valve in communication with the piston chamber above the piston so that upon opening of the valve handle the valve stem will be freed to shiftably float within the valve body with the fluid pressure within the outlet chamber acting upon the piston, causing the valve stem and valve part connected thereto to be spaced from the valve seat and thus regulate the pressure of the outlet flow from the valve.

The fire valve of this invention can be utilized where the water supply pressure to the valve exceeds safe nozzle or sprinkler pressure. This would occur particularly in high-rise buildings where it is necessary to maintain a pressure of nearly 300 p.s.i. at the ground floor inlet to accommodate a feasible valve pressure of 50 or 60 p.s.i. at a building height of several floors. It is therefore one of the purposes of this invention to provide a pressure-reducing fire valve which can be utilized at the lower levels of a high-rise building for the purpose of reducing the fluid pressure to an acceptable use level for a connected hose or sprinkler.

Another object of this invention is to provide a pressure reducing fire valve which is of economical construction.

Still another object of this invention is to provide a pressure reducing fire valve of reliable operation.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
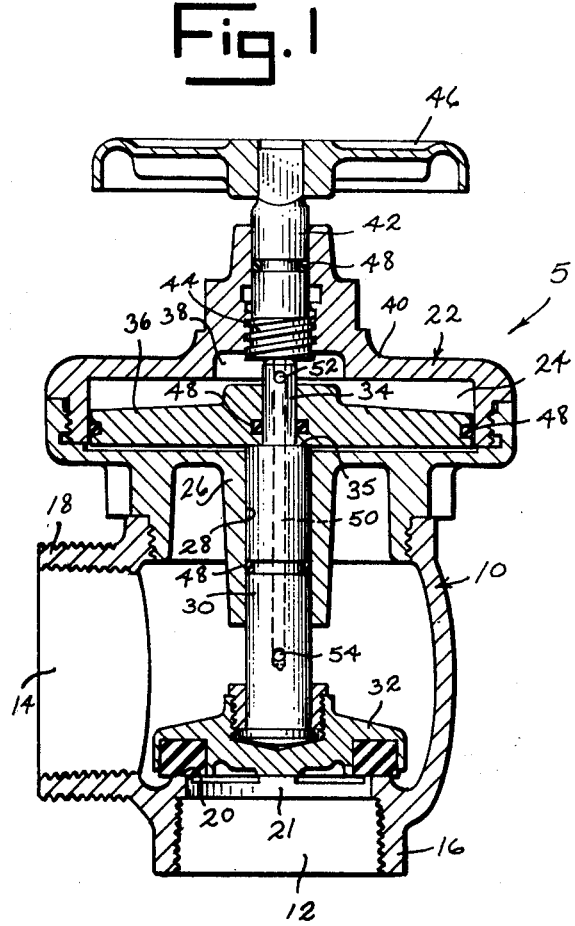
FIG. 1 is a longitudinal sectional view of one embodiment of the fire valve of this invention shown in its closed position.
Figure 2:
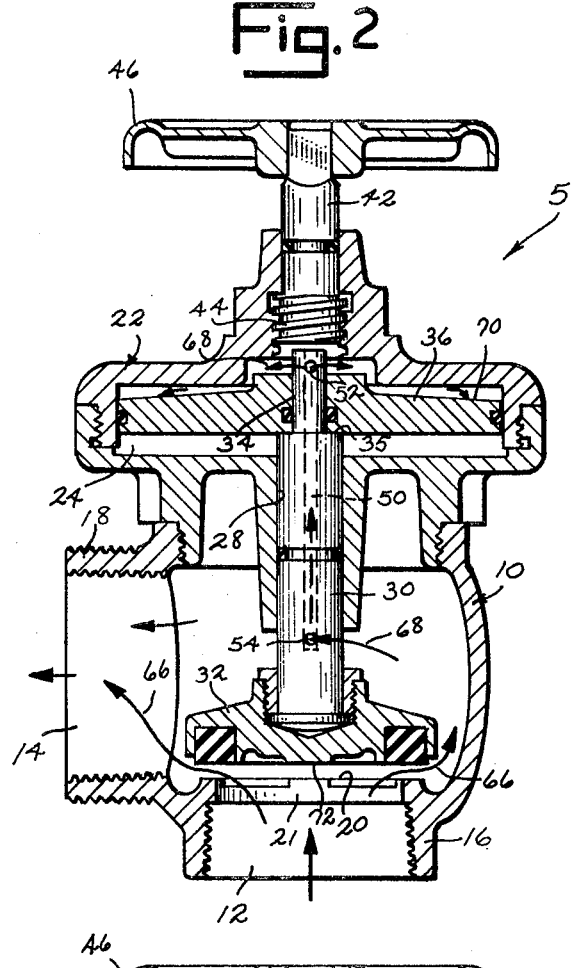
FIG. 2 is a longitudinal sectional view of the fire valve of FIG. 1 shown in an operative pressure reducing position.

Referring first to the embodiment of the fire valve 5 shown in FIGS. 1 and 2, the reference numeral 10 refers to the valve body having an inlet chamber 12 and an outlet chamber 14 formed therein. Inlet chamber 12 includes a threaded part 16 which is adapted for connection to a pipe placed in flow communication with a water supply source, such as a building water supply. Outlet chamber 14 includes a threaded part 18 which is adapted for connection either to an outlet pipe placed in flow communication with a sprinkler or to a fire hose. A valve seat 20 forming a part of valve body 10 extends between inlet chamber 12 and outlet chamber 14 and defines a passage 21 through the valve.

Valve 5 also includes a housing 22 which is connected to valve body 10 and which has a cylinder-defining chamber 24 formed therein. A lower end wall 26 of housing 22 extends into outlet chamber 14 in valve body 10 and has a guide bore 28 formed therein. A valve stem 30 fits slidably within guide bore 28, extending from chamber 24 into outlet chamber 14 of the valve body. The lower end of valve stem 30 carries a valve part 32 which is located over valve seat 20 and which upon longitudinal shiftable movement of the valve stem is brought into sealing engagement with the valve seat, as illustrated in FIG. 1. The upper end portion 34 of valve stem 30 is of reduced cross sectional dimension. A generally disk-shaped piston 36 fits within housing chamber 24 and concentrically over upper end portion 34 of valve stem 30. Piston 36 is shiftable along valve stem and part 34 between a shoulder 35 on the valve stem and the upper wall 40 of housing 22 which is preferably recessed at 38 and which forms a part of the bonnet for the valve.

The stem 42 of a valve handle extends through upper wall 40 of housing 22. The lower end 44 of handle stem 42 threadably engages the upper housing wall and is adapted to abut upper end portion 34 of valve stem 30. The upper end of handle stem 42 carries a hand wheel 46. O-rings 48 are placed between stem 30 and lower end wall 26 of the housing, upper end portion 34 of the stem and piston 36, the outer circumferential edge of piston 36 and the cylindrical side wall of housing chamber 24, and handle stem 42 and upper wall 40 of the housing for the purpose of sealing the respective moving parts against fluid flow.

Valve stem 30 has an axial bore 50 formed therein. Bore 50 extends from upper end portion 34 to a location adjacently above valve part 32. A transverse bore 52 extends through upper end portion 34 of the stem adjacently above piston 36 and in communication with axial bore 50. Another transverse bore 54 extends through stem 30 at the lower end thereof adjacently above valve part 32 and in communication with bore 50.

Figure 3:
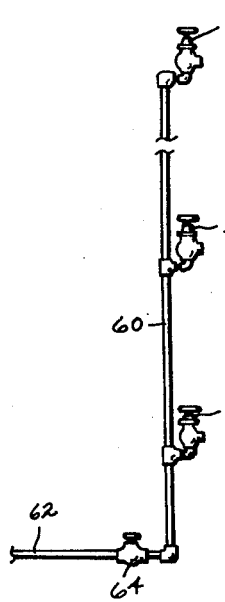
FIG. 3 is a diagrammatical view showing a plurality of the fire valves of this invention serially connected.

One operative connection of the valve 5 depicted in FIGS. 1 and 2 is shown diagrammatically in FIG. 3. A plurality of valves 5 are connected in vertical orientation and in series by a riser 60. In a multiple-story high-rise building, riser 60 may be a hundred or more feet high with one or more valves 5 being located at each floor. At or near ground level, riser 60 is connected to a water supply inlet pipe 62. Inlet pipe 62 may be connected to the building water supply or an independent water supply system which furnishes water to riser 60 at a pressure sufficient to provide a water pressure at the uppermost valve 5 connected to the riser of at least 50 to 60 p.s.i. A shut-off valve 64 is located along inlet pipe 62. Valves 5, whose operation will now be described, serve to reduce the valve inlet water pressure to a manageable valve outlet pressure for use with a fire hose or sprinkler system.

In FIG. 1, valve 5 is shown in its closed position with valve part 32 making sealing engagement with valve seat 20. At the time of a fire, hand wheel 46 will be rotated into its extreme upper position shown in FIG. 2, freeing valve stem 30 for shiftable movement within housing 22. As the valve stem is so freed, the water pressure at inlet chamber 12 forces valve part 32 upwardly away from valve seat 20 to allow flow through valve seat passage 21 and into outlet chamber 14, as indicated by arrows 66. Nearly simultaneously with the water flow into outlet chamber 14 a portion of the water will flow into transverse bore 54 in stem 30, upwardly through axial bore 50 and out transverse bore 52 in the upper end part of the stem, filling chamber 24 in housing 22 above piston 36 as shown by arrows 68. The surface area of the upper face 70 of piston 36 is so related to the area of passage 21 through valve seat 22 and the surface area of lower face 72 of valve part 32 that the water pressure within chamber 24 of housing 22 above the piston causes the piston to bear against shoulder 35 of stem 30, shifting the floating stem downwardly and causing valve part 32 to be selectively spaced from valve seat 20 to reduce the water flow into outlet chamber 14. By correlating the surface area of upper face 70 of the piston 36 with the area of passage 21 through valve seat 20 and the surface area of lower face 72 of valve part 32, the spacing between the valve part and valve seat can be regulated so that a selected differential in water pressure between inlet chamber 12 and outlet chamber 14 for a specific inlet flow pressure is effected.

Figure 4:
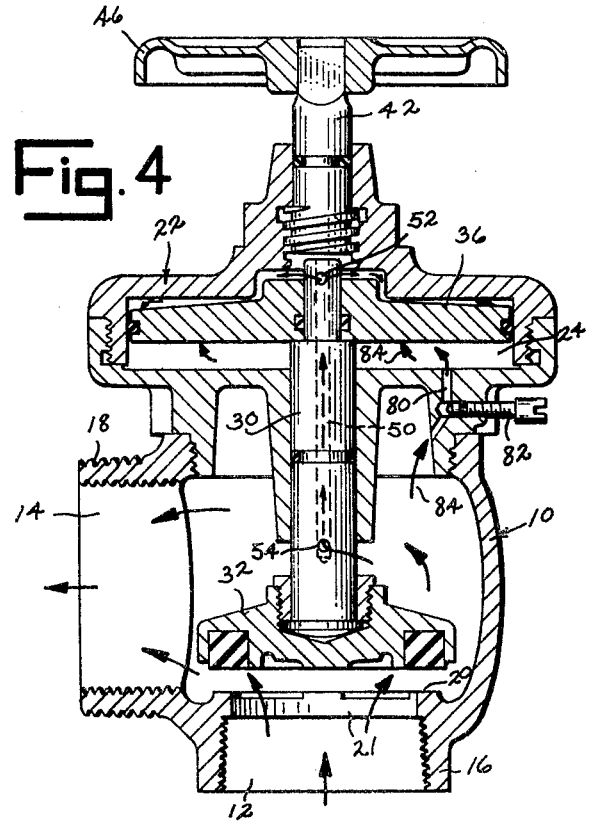
FIG. 4 is a longitudinal sectional view of a modified embodiment of the fire valve of this invention shown in an open position.

In FIG. 4 the fire valve of this invention has been modified to contain a passage 80 extending between outlet chamber 14 and chamber 24 in housing 22 below piston 36. Passage 80 is shown extending through housing 22 which receives a threaded valve member 82 utilized to close passage 80 and thus permit the valve in FIG. 4 to operate in the same manner as described for the valve embodiment shown in FIGS. 1 and 2. With valve member 82 opened as illustrated in FIG. 4, fluid flow indicated by arrows 84 passes into housing chamber 24 below piston 36, neutralizing the effect of the piston and permitting the water to flow through outlet chamber 14 at full operating pressure.

Figure 5:
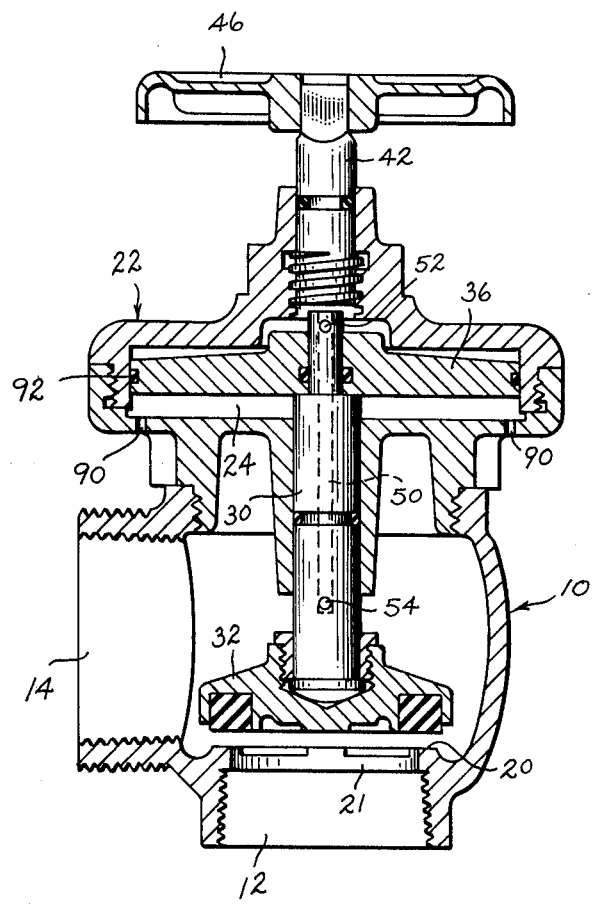
FIG. 5 is a longitudinal sectional view of another modified embodiment of the fire valve of this invention.

In the embodiments of the valve shown in FIGS. 1, 2 and 4, the compressibility of the air below piston 36 in chamber 24 will allow for the intended shifting or movement of the piston during valve usage. Additionally, the straight threaded connection at 23 between the components of housing 22 will inherently cause a venting of chamber 24 below piston 36 to more fully allow the piston to move within the chamber under the influence of the water pressure above the piston. In FIG. 5, the fire valve 5 of FIGS. 1 and 2 is shown with vent openings 90 formed in housing 22 under piston 36. The accumulative diameters of openings 90 exceed the spacing or area between piston 36 and housing 22 at O-ring 92 and the circumferential edge of the piston so that if ring 92 deteriorates to allow water leakage around the piston such water will flow out of openings 90 to permit the pressure reducing function of the valve to continue.

It is to be understood that in other embodiments of this invention an exterior passage may be formed between outlet chamber 14 and housing chamber 24 above piston 36 instead of the bores 50, 52 and 54 which are in valve stem 30. Further, if during the course of valve usage the flow rate from the water supply source severely drops or is halted, valve part 32 will drop into sealing engagement with valve seat 20 to prevent the return flow of the water in the hose and sprinkler system. This incorporated check valve system would prevent contamination of a water supply system having potable uses as well as fire fighting uses.

It is to be understood that the invention is not to be limited to the details above given but may be modified within the scope of the appended claims.

What I claim is:

1. A pressure regulating fire valve comprising a body having an inlet chamber associated with a valve inlet and an outlet chamber associated with a valve outlet, a valve seat in said body separating said inlet and outlet chambers and defining a passage between said chambers, a housing connected to said body, said housing positioned above said valve seat and having a chamber formed therein, a valve stem extending from said housing chamber and having a lower end terminating in said outlet chamber, a valve part carried by said valve stem at its lower end engageable with said valve seat, means guiding said valve stem for vertical shiftable movement wherein said valve part is shifted within said outlet chamber into and out of sealing engagement with said valve seat, piston means slidably housed within said housing chamber, said piston means carried by said valve stem and serving to vertically shift said valve stem and said valve part toward said valve seat, said piston means and valve part each having a selected fluid contact area, handle means rotatable between open and closed positions, said handle means contacting said valve stem and urging said valve part into sealing engagement with said valve seat when in its said closed position, said handle means being spaced from said valve stem when in its said open position with said stem being freely shiftable within said guide means for said vertical movement, means placing said outlet chamber and housing chamber above said piston means in flow communication wherein fluid pressure acting upon said piston means during fluid flow through said valve seat passage in conjunction with the relative fluid contacting areas of said piston means and valve part causes said valve part to be urged by said piston means toward said valve seat thereby creating a selected fluid pressure differential within said inlet and outlet chambers, said piston means and valve part constituting free-floating means for sealing said valve seat at cessation of fluid flow from said inlet chamber into said outlet chamber to prevent fluid back-flow through the valve.

2. The fire valve of claim 1 wherein said piston means fits slidably upon said stem and is shiftable longitudinally of the stem, stop means carried by said stem against which said piston means is urged by said fluid pressure within said housing chamber to urge said valve part toward said valve seat.

3. The fire valve of claim 2 wherein said valve stem has an upper end protruding above said piston means, said handle means including a handle stem abutting the upper end of said valve stem, said housing including means threadably engaging said handle stem wherein rotative movement of said handle means causes said vertical shiftable movement of said valve stem.

4. The fire valve of claim 1 and means placing said outlet chamber and housing chamber below said piston means in fluid communication and including valving means for terminating fluid flow through said last mentioned outlet chamber and housing chamber communication means.

5. The fire valve of claim 1 wherein said housing includes opening means vented to the atmosphere formed therein below said piston means in all operative positions of said piston means.

* * * * *